UNITED STATES PATENT OFFICE.

JOHN LUTHER BOWERS, OF MONTICELLO, CALIFORNIA.

PROCESS OF PRESERVING PRUNES.

No. 830,407.

Specification of Letters Patent.

Patented Sept. 4, 1906.

Application filed June 13, 1906. Serial No. 265,071.

*To all whom it may concern:*

Be it known that I, JOHN LUTHER BOWERS, a citizen of the United States of America, residing at Monticello, in the county of Napa and State of California, have invented new and useful Improvements in Processes of Preserving Fruit, of which the following is a specification.

This invention relates to the art of preserving, being especially directed to an improved process of preserving prunes, and has for its objects to provide a method whereby the fruit may be preserved dry and in its natural state without boiling or otherwise subjecting the fruit at any stage to the direct action of liquid.

Heretofore it has been the practice, particularly in preparing prunes for the market, to first treat the fruit in vats of boiling water containing a percentage of lye, the fruit being thereafter dried, then again subjected for a suitable period to the action of boiling water containing glycerin, glucose, and other ingredients, and finally packed, while in a wet, heated state, in boxes or other receptacles for the market. Under this method the prunes, after packing, are subject to mold and fermentation, while during their treatment, prior to being packed, there is grave liability of the formation of gas between the inner skin and pit, thus spoiling the fruit and producing what are known to the trade as "bloaters" or "frogs," which are unacceptable to the packers, and consequently a source of considerable loss to the producers.

The improved process constituting the subject-matter of the present invention consists in partially drying the prunes, dry-packing the fruit in partially-dried condition in cans, jars, or other receptacles, hermetically sealing the receptacles, and finally subjecting the receptacles containing the fruit to the action of heat to sterilize the fruit.

In carrying my process into effect I preferably take the fruit in its natural state and place the same in pans or trays and subject it to the action of solar or other dry heat until partially dried, then dry-pack the fruit in suitable receptacles, which are next hermetically sealed and finally boiled or otherwise treated with heat for sterilizing the fruit.

By my process there is a material saving in the matter of preserving the fruit as compared with the old method, while at the same time liability of the prunes becoming moldy, wormy, or undergoing fermentation is wholly obviated, and the fruit is received by the consumer in a perfectly natural and highly desirable state.

Having thus described my invention, what I claim is—

1. The process of preserving prunes consisting in partially drying the same, dry-packing the prunes without further processing in receptacles, hermetically closing the latter, and finally subjecting the receptacles to heat for sterilizing the prunes.

2. The process of preserving prunes consisting in partially drying the latter, dry-packing the partially-dried prunes without further processing in receptacles, hermetically closing the receptacles and finally boiling the latter to sterilize the contained prunes.

In testimony whereof I affix my signature in presence of two witnesses.

JOHN LUTHER BOWERS.

Witnesses:
WM. D. MCKENZIE,
H. S. GEER.